US012565561B2

(12) United States Patent
Haruta

(10) Patent No.: US 12,565,561 B2
(45) Date of Patent: Mar. 3, 2026

(54) HEAT-SHRINKABLE POLYESTER-BASED FILM, HEAT-SHRINKABLE LABEL, AND PACKAGING BODY

(71) Applicant: TOYOBO CO., LTD., Osaka (JP)

(72) Inventor: Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 519 days.

(21) Appl. No.: 18/006,521

(22) PCT Filed: Jul. 21, 2021

(86) PCT No.: PCT/JP2021/027385
§ 371 (c)(1),
(2) Date: Jan. 23, 2023

(87) PCT Pub. No.: WO2022/024936
PCT Pub. Date: Feb. 3, 2022

(65) Prior Publication Data
US 2023/0348661 A1      Nov. 2, 2023

(30) Foreign Application Priority Data

Jul. 29, 2020      (JP) ................................ 2020-128547

(51) Int. Cl.
| | |
|---|---|
| *C08G 63/183* | (2006.01) |
| *B65D 65/22* | (2006.01) |
| *C08J 5/18* | (2006.01) |
| *G09F 3/00* | (2006.01) |
| *G09F 3/02* | (2006.01) |

(52) U.S. Cl.
CPC ........... *C08G 63/183* (2013.01); *B65D 65/22* (2013.01); *C08J 5/18* (2013.01); *G09F 3/0291* (2013.01); *B65D 2203/02* (2013.01); *C08J 2367/02* (2013.01); *G09F 2003/0273* (2013.01)

(58) Field of Classification Search
CPC .................................................. C08G 63/183
See application file for complete search history.

(56) References Cited

U.S. PATENT DOCUMENTS

| | | | |
|---|---|---|---|
| 2005/0095379 A1* | 5/2005 | Hayakawa ............ | B29C 61/003 |
| | | | 428/480 |
| 2012/0088112 A1* | 4/2012 | Ito .......................... | B32B 27/36 |
| | | | 524/145 |
| 2015/0014202 A1* | 1/2015 | Haruta ................... | B65D 53/06 |
| | | | 206/459.5 |
| 2018/0208375 A1* | 7/2018 | Haruta ................... | B29C 55/14 |
| 2018/0229422 A1* | 8/2018 | Inoue .................... | B65D 75/02 |
| 2019/0375552 A1* | 12/2019 | Haruta ................. | B65D 25/205 |
| 2021/0394468 A1* | 12/2021 | Peters ........................ | C08J 5/18 |

FOREIGN PATENT DOCUMENTS

| | | |
|---|---|---|
| JP | 2014-024253 A | 2/2014 |
| JP | 2020-012086 A | 1/2020 |

OTHER PUBLICATIONS

Japanese Patent Office, International Search Report in International Patent Application No. PCT/JP2021/027385 (Aug. 31, 2021).
European Patent Office, Extended European Search Report in European Patent Application No. 21849664.4 (Jul. 8, 2024).

* cited by examiner

*Primary Examiner* — Michael L Leonard
(74) *Attorney, Agent, or Firm* — Leydig, Voit & Mayer, Ltd.

(57) ABSTRACT

The invention provides a heat-shrinkable polyester-based film which has a high heat shrinkage ratio in the main shrinkage direction, as well as a high film puncture strength, bag breakage resistance upon bottle dropping, and excellent stiffness because of the high density of the film. The heat-shrinkable polyester-based film contains 60-95 mol % ethylene terephthalate units in 100 mol % of all ester units, 5-40 mol % diethylene glycol in 100 mol % of the polyhydric alcohol component, and 0-5 mol % constituent units derived from a monomer component that can be an amorphous component in all polyester resin components, in which the hot water heat shrinkage ratio, the puncture strength of the film, the density of the film, and the refractive index in the longitudinal direction of the film are within predetermined ranges when the film is immersed in hot water at 90° C. for 10 seconds.

6 Claims, No Drawings

HEAT-SHRINKABLE POLYESTER-BASED FILM, HEAT-SHRINKABLE LABEL, AND PACKAGING BODY

TECHNICAL FIELD

The present invention relates to a heat-shrinkable polyester-based film, and more particularly to a heat-shrinkable polyester-based film which has a high film puncture strength and from which, in the case of making a label for a PET bottle beverage, the label has a high puncture strength and has excellent bag-drop resistance; a heat-shrinkable label; and a packaging body.

BACKGROUND ART

In recent years, drawn films (so-called heat-shrinkable films) made of a polyvinyl chloride-based resin, a polystyrene-based resin, a polyester-based resin, or the like have been widely used in applications such as label packaging for protecting glass bottles, PET bottles, and the like and also for displaying products, cap sealing, and multi-item packaging. Among such heat-shrinkable films, polyvinyl chloride-based films have low heat resistance, and also have problems that hydrogen chloride gas is generated during incineration, which causes dioxin. In addition, the polystyrene-based film has disadvantages that the film is poor in solvent resistance, needs to use an ink having a special composition at the time of printing, and it needs to be incinerated at a high temperature, whereby a large amount of black smoke is generated with an odor at the time of incineration. Thus, a polyester-based heat-shrinkable film which has high heat resistance, is easily incinerated, and is excellent in solvent resistance has been widely used as a shrinkage label, and the amount the film used tends to increase with an increase in the amount of PET containers distributed.

A general heat-shrinkable polyester-based film that shrinks largely in the width direction is widely used. The film is drawn by a tenter drawing method or the like to prepare a wide master roll, and then the master roll is wound into a roll having a predetermined winding length while being slit at a predetermined width to form a film roll product. The film is subjected to a printing step in the form of a roll for the purpose of imparting a design to the film and displaying a product. After printing, the film is slit again to a necessary width and wound into a roll shape, and then subjected to a center sealing step by solvent bonding to be formed into a tube-shaped bag and wound into a roll shape (into a roll of a label).

The label that is formed into a tube-shaped bag and wound is cut to a necessary length while being unwound from the roll, and becomes an annular label. The annular label is attached to the article to be packaged using a method such as covering by hand, and shrunk by passing through a steam tunnel, a hot air tunnel, or the like to form a label.

In recent years, for the purpose of reducing the amount of waste, the weight of a PET bottle container has been reduced, and the thickness of the PET bottle container has also been reduced. In a case in which the thickness of the PET bottle container becomes thin, there is a problem that the PET bottle container is deformed when dropped and the label tears. In addition, a label using a heat-shrinkable film is also required to have a small thickness for volume reduction. In recent years, the films having a thickness of 20 to 40 μm increase compared to the films having a thickness of 45 to 60 μm. However, by reducing the film thickness, the bag-drop resistance of the label deteriorates. It is therefore important to improve the bag-drop resistance of the film.

In addition, when the thickness becomes thin, the stiffness is lowered, and there is a concern that, after printing the film into a label, the label is bent in a step of attaching it to a PET bottle, resulting in attaching failure.

Patent Document 1 describes a method for improving bag breakage resistance upon dropping the film. According to the document, the puncture strength is an important factor for bag breakage resistance as film characteristics. However, Patent Document 1 describes evaluation of bag breakage resistance of a bag which is formed from a non-heat-shrinkable film using a composition obtained by mixing polyester and polybutylene terephthalate, and there is no description on a heat-shrinkable film or a label using a heat-shrinkable film.

Patent Document 2 discloses a method for improving attaching failure caused by bending a label in a step of attaching the label to a PET bottle. The document describes increasing the film strength in the height direction (non-shrinkage direction) during label attaching by drawing the film biaxially in the non-shrinkage direction and the shrinkage direction. However, in this method, since there is a step of biaxial drawing in which the film is drawn not only in the film width direction but also in the longitudinal direction, the facility is inevitably long, which is not preferable.

PRIOR ART DOCUMENTS

Patent Documents

Patent Document 1: JP-A-2020-12086
Patent Document 2: JP-A-2014-24253

SUMMARY OF THE INVENTION

Problems to be Solved by the Invention

An object of the present invention is to provide a heat-shrinkable polyester-based film which has a high heat shrinkage ratio in the main shrinkage direction, and moreover has a high film puncture strength, exhibits bag breakage resistance upon bottle dropping, and is excellent in stiffness because of the high density of the film.

Solutions to the Problems

A present invention which can solve the above problems has following features:

1. A heat-shrinkable polyester-based film comprising:
   the heat-shrinkable polyester-based film contains
   60 mol % or more and 95 mol % or less of ethylene terephthalate units in 100 mol % of all ester units,
   5 mol % or more and 40 mol % or less of diethylene glycol in 100 mol % of the polyhydric alcohol component, and
   0 mol % or more and 5 mol % or less of constituent units derived from a monomer component that can be an amorphous component in all polyester resin components,
   and the heat-shrinkable polyester-based film satisfies the following requirements (1) to (5):
   (1) a hot water heat shrinkage ratio in the film width direction is 40% or more and 80% or less when the film is immersed in hot water at 90° C. for 10 seconds;

3

(2) a hot water heat shrinkage ratio in the film longitudinal direction is −5% or more and 15% or less when the film is immersed in hot water at 90° C. for 10 seconds;

(3) a puncture strength of the film is 0.2 N/μm or more and 0.6 N/μm or less;

(4) a density of the film is 1.330 g/cm³ or more and 1.385 g/cm³ or less; and (5) the refractive index in the film longitudinal direction is 1.575 or less.

2. The heat-shrinkable polyester-based film according to above 1, wherein a thickness of the film is 15 μm or more.

3. The heat-shrinkable polyester-based film according to above 1 or 2, wherein a haze value at a thickness of 20 μm of the film is 2% or more and 10% or less.

4. The heat-shrinkable polyester-based film according to any one of above 1 to 3, wherein the puncture strength of the film is 0.1 N/μm or more and 0.5 N/μm or less.

5. A heat-shrinkable label including the heat-shrinkable polyester-based film according to any one of above 1 to 4.

6. A packaging body comprising
an object to be packed; and
the heat-shrinkable label according to above 5;
wherein at least a part of a periphery of the object is packed by the label.

Effects of the Invention

The heat-shrinkable polyester-based film of the present invention not only has a high shrinkage ratio, but also has a high puncture strength after 10% shrinkage, so that bag breakage of the label is less likely to occur even if the label attached to a PET bottle is dropped with the bottle. In addition, since the density is high, failures during attaching it to a PET bottle can be reduced.

MODE FOR CARRYING OUT THE INVENTION

Hereinafter, the heat-shrinkable polyester-based film of the present invention will be described in detail. The method for producing the heat-shrinkable polyester-based film will be described in detail later. The heat-shrinkable film is usually obtained by conveying and drawing the film using a roll or the like. At this time, a conveying direction of the film (film forming direction) is referred to as a longitudinal direction, and a direction orthogonal to the longitudinal direction is referred to as a film width direction. Thus, the width direction of the heat-shrinkable polyester-based film described below is a direction perpendicular to the roll unwinding direction, and the film longitudinal direction is a direction parallel to the roll unwinding direction.

The heat-shrinkable polyester-based film of the present invention is a heat-shrinkable polyester-based film containing 60 mol % or more and 95 mol % or less of ethylene terephthalate units in 100 mol % of all ester units, 5 mol % or more and 40 mol % or less of diethylene glycol in 100 mol % of the polyhydric alcohol component, and 0 mol % or more and 5 mol % or less of constituent units derived from a monomer component that can be an amorphous component in all polyester resin components, and the heat-shrinkable polyester-based film satisfies the following requirements (1) to (5):

(1) the hot water heat shrinkage ratio in the film width direction is 40% or more and 80% or less when the film is immersed in hot water at 90° C. for 10 seconds;

(2) the hot water heat shrinkage ratio in the film longitudinal direction is −5% or more and 15% or less when the film is immersed in hot water at 90° C. for 10 seconds;

(3) the puncture strength of the film is 0.2 N/μm or more and 0.6 N/μm or less;

(4) the density of the film is 1.33 g/cm³ or more and 1.385 g/cm³ or less; and (5) the refractive index in the film longitudinal direction is 1.575 or less.

In a heat-shrinkable polyester-based film, in order to obtain high shrinkability, one obtained by copolymerization of, for example, a homopolymer composed of ethylene terephthalate (PET) with another polycarboxylic acid component or another polyhydric alcohol component is widely used. As the polyhydric alcohol component to be used as the component for copolymerization, for example, neopentyl glycol and 1,4-cyclohexanedimethanol are considered and widely used. In the case of a film obtained by copolymerizing with such a component, the chemical cost is high as compared with a diethylene glycol film. In addition, in the case of obtaining a raw material resin by copolymerizing with diethylene glycol, since diethylene glycol is a liquid at normal temperature, a melting step required for a powder raw material such as neopentyl glycol is unnecessary. Furthermore, as compared with neopentyl glycol, the polymerization activity is high and there is also an advantage that foaming during polymerization, which leads to a decrease in productivity, is less. As compared with diethylene glycol, a polyester raw material obtained by copolymerizing with neopentyl glycol or 1,4-cyclohexanedimethanol has a low density, whereby a film formed from the polyester raw material has a low density and is inferior in stiffness.

The film of the present invention contains ethylene terephthalate as the main constituent. Here, the main constituent means that 60 mol % or more in all polymer constituents constituting the film is ethylene terephthalate. More preferably, ethylene terephthalate is contained in an amount of 65 mol % or more. By using ethylene terephthalate as the main constituent, high density, excellent mechanical strength, and transparency can be achieved.

As a polymerization method of polyethylene terephthalate (hereinafter, sometimes simply referred to as PET), any production method can be used, such as a direct polymerization method in which terephthalic acid and ethylene glycol, and if necessary, another dicarboxylic acid component, and another diol component are directly reacted, and a transesterification method in which a dimethyl ester of terephthalic acid (including a methyl ester of another dicarboxylic acid if necessary) and ethylene glycol (including another diol component if necessary) are subjected to a transesterification reaction.

Examples of the dicarboxylic acid component other than terephthalic acid constituting the polyester used in the film of the present invention include aromatic dicarboxylic acids such as isophthalic acid, naphthalenedicarboxylic acid, and o-phthalic acid; aliphatic dicarboxylic acids such as adipic acid, azelaic acid, sebacic acid, and decanedicarboxylic acid; and alicyclic dicarboxylic acids such as 1,4-cyclohexanedicarboxylic acid.

When the aliphatic dicarboxylic acid (for example, adipic acid, sebacic acid, decanedicarboxylic acid, or the like) is contained, the content is preferably less than 3 mol %. In a heat-shrinkable polyester-based film obtained using a polyester containing 3 mol % or more of such an aliphatic dicarboxylic acid, film stiffness during high-speed attaching is insufficient.

In addition, it is preferable not to contain a trivalent or higher polycarboxylic acid (for example, trimellitic acid, pyromellitic acid, or an anhydride thereof). In a heat-shrinkable polyester-based film obtained using a polyester containing such a polycarboxylic acid, it is difficult to achieve the required shrinkage.

It is necessary that diethylene glycol accounts for 5 mol % or more and 40 mol % or less of 100 mol % of the polyhydric alcohol component constituting the polyester used in the film of the present invention. When diethylene glycol is contained in an amount within the above range, high heat shrinkability can be imparted. In a case in which the content of diethylene glycol is less than 5 mol %, it is difficult to obtain a film having a high shrinkage ratio such as a hot water shrinkage ratio at 90° C. of 70% or more, which is not preferable. Diethylene glycol is more preferably 6 mol % or more, and particularly preferably 8 mol % or more. There is no problem even if the upper limit of diethylene glycol is high. However, if it is too high, there are concerns about a decrease in activation and foaming during polymerization, and foreign matters in the melt-extrusion step for forming a film, and thus the upper limit was set to 40 mol % in the present invention.

Examples of the polyhydric alcohol component other than ethylene glycol and diethylene glycol constituting the polyester used in the present invention include aliphatic diols such as 1-3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 1-4-butanediol, neopentyl glycol, and hexanediol, alicyclic diols such as 1,4-cyclohexanedimethanol, and aromatic diols such as bisphenol A.

It is preferable not to contain a diol having 8 or more carbon atoms (for example, octanediol) or a trihydric or higher polyhydric alcohol (for example, trimethylolpropane, trimethylolethane, glycerin, or diglycerin). In a heat-shrinkable polyester-based film obtained using a polyester containing such a diol or polyhydric alcohol, it is difficult to achieve the required high shrinkage.

Various additives such as waxes, antioxidants, antistatic agents, crystal nucleating agents, viscosity-decreasing agents, heat stabilizers, coloring pigments, anti-coloring agents, and ultraviolet absorbers can be added to the resin for forming the heat-shrinkable polyester-based film of the present invention if necessary.

To the resin for forming the heat-shrinkable polyester-based film of the present invention, it is preferable to add fine particles as a lubricant for improving the workability (slipperiness) of the film. As the fine particles, any particles can be selected, and examples of the inorganic fine particles include silica, alumina, titanium dioxide, calcium carbonate, kaolin, and barium sulfate, and examples of the organic fine particles include acrylic resin particles, melamine resin particles, silicone resin particles, and crosslinked polystyrene particles. The average particle diameter of the fine particles can be appropriately selected as necessary within a range of 0.05 to 3.0 μm (when measured by a Coulter counter).

With regard to a method for blending the particles in the resin for forming the heat-shrinkable polyester-based film, for example, the particles can be added at any stage of producing the polyester-based resin, but it is preferable that the particles are added as a slurry formed by dispersion in ethylene glycol or the like at a stage of esterification or a stage before starting the polycondensation reaction after completion of the transesterification reaction, allowing the polycondensation reaction to proceed. In addition, it is also preferable to use a method of blending a slurry of particles dispersed in ethylene glycol, water, or the like with a polyester-based resin raw material using a kneading extruder with a vent, a method of blending dried particles with a polyester-based resin raw material using a kneading extruder, or the like.

Examples of the monomer that can be an amorphous component among the above-described monomer components include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. The content of the monomer that can be the amorphous component in the copolyester is preferably 0 mol % or more and 5 mol % or less, and more preferably 0 mol % (i.e. such a monomer is not contained).

In the heat-shrinkable polyester-based film of the present invention treated in hot water at 90° C. under no-load conditions for 10 seconds, the heat shrinkage ratio of the film in the main shrinkage direction calculated from the lengths before and after shrinkage according to the following formula 1 (i.e. hot water heat shrinkage ratio at 90° C.) is preferably 40% or more and 80% or less.

$$\text{Heat shrinkage ratio} = \{(\text{length before shrinkage} - \text{length after shrinkage})/\text{length before shrinkage}\} \times 100 \ (\%) \qquad \text{Formula 1}$$

In a case in which the hot water heat shrinkage ratio at 90° C. in the main shrinkage direction is less than 40%, label wrinkles and slack are generated after heat shrinkage due to a small shrinkable amount when the film is used for beverage label applications or as a film for box lunch packaging, which is not preferable. The hot water shrinkage ratio at 90° C. is more preferably 43% or more, particularly preferably 46% or more, and most preferably 50% or more.

There is no problem even if the hot water heat shrinkage ratio at 90° C. in the main shrinkage direction is higher than 80%. However, since a film having a hot water heat shrinkage ratio at 90° C. of higher than 80% was not obtainable in the present invention, the upper limit was set to 80%.

The heat-shrinkable polyester-based film of the present invention preferably has a hot water heat shrinkage ratio at 90° C. of −5% or more and 15% or less in the longitudinal direction orthogonal to the main shrinkage direction. In a case in which the hot water shrinkage ratio at 90° C. in the longitudinal direction is less than −5%, when the film is used for beverage label applications, the label is elongated and the height of the label on a PET bottle becomes long, which is not preferable. The hot water shrinkage ratio at 90° C. in the longitudinal direction is more preferably −4% or more, and particularly preferably −3% or more.

In a case in which the hot water shrinkage ratio at 90° C. in the longitudinal direction is more than 15%, when the film is used for beverage label applications, the label shrinks and the height of the label on a PET bottle becomes short, which is not preferable. This also causes label distortion after shrinkage. The hot water shrinkage ratio at 90° C. in the longitudinal direction is more preferably 13% or less, still more preferably 11% or less, particularly preferably 8% or less, and most preferably 5% or less.

The heat-shrinkable polyester-based film of the present invention preferably has a puncture strength of 0.2 N/μm or more and 0.6 N/μm or less. Note that the puncture strength is measured by the method described in EXAMPLES. In a case in which the tensile strength is 0.2 N/μm or less, in a PET bottle label for beverages using a thin heat-shrinkable film, bag breakage of the label occurs when the PET bottle drops at the time of purchase from a vending machine, which is not preferable. The puncture strength is more preferably 0.25 N/μm or more, and particularly preferably 0.3 N/μm or more. There is no problem even if the puncture strength is higher than 0.6 N/μm. However, since a film having a puncture strength higher than 0.6 N/μm was not obtainable in the present invention, the upper limit was set to 0.6 N/μm.

The heat-shrinkable polyester-based film of the present invention preferably has a puncture strength of 0.1 N/μm or more and 0.5 N/μm or less after the film is shrunk by 10% in the width direction. Since a heat-shrinkable polyester-based film is generally heat shrunk and used, the film after 10% shrinkage is a film which is assumed as a label after shrinkage. In a case in which the puncture strength is 0.1 N/μm or less, in a PET bottle label for beverages using a thin heat-shrinkable film, bag breakage of the label occurs when the PET bottle drops at the time of purchase from a vending machine, which is not preferable. The puncture strength of the film after 10% shrinkage is more preferably 0.15 N/μm or more, and particularly preferably 0.2 N/μm or more. There is no problem even if the puncture strength of the film after 10% shrinkage is higher than 0.5 N/μm. However, since a film having a film puncture strength after 10% shrinkage of higher than 0.5 N/μm was not obtainable in the present invention, the upper limit was set to 0.5 N/μm.

The heat-shrinkable polyester-based film of the present invention preferably has a refractive index of 1.575 or less in the film longitudinal direction. Note that the measurement of the refractive index is measured by the method described in EXAMPLES.

In general, when a film has a high refractive index, the tensile strength at break of the film increases, but the tensile elongation at break of the film decreases. In a case in which the film tensile elongation at break decreases, that is, the film is difficult to stretch (becomes brittle), in a PET bottle label for beverages using a thin heat-shrinkable film, bag breakage of the label occurs when the PET bottle drops at the time of purchase from a vending machine, which is not preferable. In particular, since the film longitudinal direction is the non-shrinkage direction, perforations or notches are often formed such that the label can be easily detached, and thus the refractive index in the film longitudinal direction is important. The refractive index in the film longitudinal direction is more preferably 1.572 or less, and particularly preferably 1.569 or less. The lower limit of the refractive index in the film longitudinal direction is not defined, but the refractive index in the longitudinal direction is about 1.55 to about 1.56 even for an undrawn film, and thus does not fall below 1.55.

The heat-shrinkable polyester-based film of the present invention preferably has a density of 1.33 g/cm³ or more. In a case in which the density of the film is less than 1.330 g/cm³, a label using a thin heat-shrinkable film has insufficient stiffness for a step of attaching the label to a PET bottle for beverages, and the label bents or the label is not fixed in place, which is not preferable. The density of the film is more preferably 1.340 g/cm³ or more, and particularly preferably 1.350 g/cm³ or more. The density of the film is preferably higher for the stiffness, but is preferably 1.385 g/cm³ or less. If it is higher than 1.385 g/cm³, the film is crystallized and the shrinkage ratio in the width direction at 90° C. as described above cannot be obtained. The density of the heat-shrinkable polyester-based film is more preferably 1.384 g/cm³ or less, and particularly preferably 1.383 g/cm³ or less.

8

The thickness of the heat-shrinkable polyester-based film of the present invention is not particularly limited, but is preferably 15 to 50 μm as a heat-shrinkable film for label applications and box lunch packaging applications. In a case in which the film thickness is less than 15 μm, the stiffness of the film is significantly reduced whereby the roll is easily wrinkled, which is not preferable. On the other hand, although there is no problem as a film roll even if the film thickness is large, it is preferable to reduce the thickness from the viewpoint of cost. The thickness of the film is more preferably 17 to 45 μm, and particularly preferably 20 μm to 40 μm.

The heat-shrinkable polyester-based film of the present invention preferably has a haze value at a thickness of 20 μm of 2% or more and 10% or less. The heat-shrinkable film is a film which serves to increase the designability. In a case in which the haze value is higher than 10%, when the film becomes a label of a PET bottle, the content cannot be clearly seen and the designability deteriorates, which is not preferable. The haze at a film thickness of 20 μm is more preferably 8% or less, and particularly preferably 6% or less.

There is no problem even if the haze at a film thickness of 20 μm is less than 2%. However, in the present invention, when the haze value was less than 2%, the slipperiness of the film deteriorated, and thus the lower limit was set to 2%.

The heat-shrinkable polyester-based film of the present invention can be obtained by melt-extruding the above-described polyester raw material with an extruder to form an undrawn film, and drawing the undrawn film in the width direction. The polyester can be obtained by polycondensation of the above-described suitable dicarboxylic acid component and diol component by a known method. In addition, usually, polyester in the form of chips is used as a raw material of the film.

When the raw material resin is melt-extruded, the polyester raw material is preferably dried using a dryer such as a hopper dryer or a paddle dryer, or a vacuum dryer. After the polyester raw material is dried as described above, the polyester raw material is melted at a temperature of 230 to 270° C. and extruded into a film shape using an extruder. In the extrusion, any existing method such as a T-die method or a tubular method can be adopted.

Then, an undrawn film can be obtained by rapidly cooling the extruded sheet-shaped molten resin. As a method of rapidly cooling the molten resin, a method in which the molten resin is cast from a die onto a rotary drum, rapidly cooled and solidified to obtain a substantially unoriented resin sheet can be suitably employed.

The obtained undrawn film can be drawn in the width direction under predetermined conditions to obtain the heat-shrinkable polyester-based film of the present invention, as described below. Hereinafter, preferred drawing for obtaining the heat-shrinkable polyester-based film of the present invention will be described.

A general heat-shrinkable polyester-based film is produced by drawing an undrawn film in a direction to be shrunk. Alternatively, as a production method, there is biaxial drawing in which longitudinal drawing is followed by lateral drawing. However, in the case of biaxial drawing, large-scale equipment is required. In the present invention, the film is uniaxially drawn in the width direction which is the main shrinkage direction. The production method by uniaxial drawing in the width (lateral) direction has an advantage that it does not use drawing equipment in the longitudinal direction, and thus production can be performed with simple equipment.

Drawing in the width direction is performed by guiding an undrawn film to a tenter device capable of heating the film while holding both ends of the film with clips, heating the film to a predetermined temperature with hot air, and then widening a distance between the clips while conveying the film in the longitudinal direction.

The undrawn film is preferably preheated at a preheating temperature of Tg of the film+30° C. or more and Tg+80° C. or less. The preheating temperature is more preferably Tg+20° C. or more and Tg+60° C. or less. In a case in which the temperature is lower than Tg+30° C., the preheating temperature is insufficient whereby the drawing force increases and breakage easily occurs, which is not preferable. In addition, in the case of heating at a temperature higher than Tg+80° C., the drawing force of the undrawn sheet in the width direction decreases, resulting in deterioration of thickness accuracy in the width direction (uneven thickness), which is not preferable. The preheating temperature is more preferably Tg+40 or more and Tg+70° C. or less.

The film temperature during the width direction drawing is preferably Tg° C. or more and Tg+30° C. or less. In a case in which the film temperature is less than Tg, the drawing force becomes too high whereby film breakage easily occurs, which is not preferable. In a case in which the film temperature exceeds Tg+30° C., the drawing force is too low whereby the heat shrinkage ratio in the width direction measured at 90° C. as described above is lowered, which is not preferable. The temperature is more preferably Tg+3° C. or more and Tg+25° C. or less, and still more preferably Tg+5° C. or more and Tg+25° C. or less.

The draw ratio in the width direction is preferably 3.5 times or more and 6 times or less. When the draw ratio is less than 3.5 times, the drawing force is insufficient, resulting in deterioration of the thickness accuracy in the film width direction (so-called uneven thickness). In a case in which the draw ratio exceeds 6 times, the risk of breakage during film formation increases, and the facility becomes long, which is not preferable. The draw ratio is more preferably 3.7 times or more and 5.5 times or less. Although not particularly limited, heat treatment may be performed for adjusting the shrinkage ratio after drawing in the width direction. The film temperature during heat fixation (heat treatment) is preferably the film drawing temperature in the width direction or more and Tg+50° C. or less. In a case in which the film temperature is lower than the film drawing temperature in the width direction, molecular relaxation in the width direction becomes insufficient and thus there is no effect of heat fixation, which is not preferable. In a case in which the film temperature exceeds Tg+50° C., the film is crystallized whereby the shrinkage ratio is lowered, which is not preferable. The film temperature during heat fixation is more preferably the film drawing temperature in the width direction+1° C. or more and Tg+45° C. or less, and still more preferably the film drawing temperature in the width direction+2° C. or more and Tg+40° C. or less.

At the time of drawing in the width direction, it is preferable to perform relaxation in the longitudinal direction. The heat shrinkage ratio in the longitudinal direction is caused by residual stress of stress in a direction orthogonal to the drawing direction (so-called necking force) generated at the time of drawing in the width direction. Thus, by relaxation in the longitudinal direction at the time of drawing in the width direction, the residual stress in the longitudinal direction can be relaxed, and the heat shrinkage ratio in the longitudinal direction can be reduced. The relaxation in the longitudinal direction was performed while the distance between the clips were being shortened. The relaxation ratio in the longitudinal direction is preferably 0% or more and 4% or less. Even if the relaxation ratio in the longitudinal direction is 0%, there is no problem as long as the heat shrinkage ratio in the longitudinal direction satisfies the target. In a case in which the relaxation ratio in the longitudinal direction is more than 4%, the amount of the film relaxation is higher than the amount of shrinkage of the film whereby insufficient relaxation occurs and flatness deteriorates, which is not preferable. The relaxation ratio is more preferably 1% or more and 3% or less. When the relaxation ratio is within this range, a film having a high heat shrinkage ratio particularly in the width direction and a low heat shrinkage ratio in the longitudinal direction can be obtained.

EXAMPLES

Hereinafter, the present invention will be described in more detail with reference to examples, but the present invention is not limited to the modes of the examples, and can be appropriately changed without departing from the gist of the present invention.

The method for evaluating the film is as follows.

Limiting Viscosity (IV)

In 50 ml of a mixed solvent of phenol/1,1,2,2-tetrachloroethane (60/40 (weight ratio)), 0.2 g of polyester was dissolved, and measurement was performed at 30° C. using an Ostwald viscometer. The unit is dl/g.

Heat Shrinkage Ratio (Hot Water Heat Shrinkage Ratio)

A film was cut into a 10 cm×10 cm square, immersed in hot water at a predetermined temperature ±0.5° C. in a no-load state for 10 seconds to be heat shrunk, then immersed in water at 25° C.±0.5° C. for 10 seconds, and pulled out of the water. The longitudinal and lateral dimensions of the film were measured, and the heat shrinkage ratio of each was determined according to the following formula (1). A direction in which the heat shrinkage ratio was large was defined as the main shrinkage direction.

$$\text{Heat shrinkage ratio} = \{(\text{length before shrinkage} - \text{length after shrinkage})/\text{length before shrinkage}\} \times 100 \ (\%) \qquad \text{Formula 1}$$

Puncture Strength of Film

A value measured by a test method in accordance with JIS-Z1707 was converted in terms of 1 μm by calculating according to the following formula (2).

$$\text{Puncture strength} = \text{measured puncture strength}/\text{film thickness (N/μm)} \qquad \text{Formula 2}$$

Puncture Strength of Film after 10% Shrinkage

A rectangular frame having a space of 200 mm (the lengths of the space of the frame were 200 mm width and 250 mm height) was prepared. The film was attached to the frame such that the film in the main shrinkage direction (width direction) was slackened by 23 mm (film length in the frame was 223 mm). At this time, the film in the longitudinal direction was not fixed, and the length was 200 mm. The film attached to the frame was placed in hot water heated to 80° C.±0.5° C., taken out immediately after the slack of the film disappeared, immersed in water at 25° C.±0.5° C. for 10 seconds, pulled out of the water, and wiped with a towel to remove water. Thereafter, the puncture strength of the film was measured by the method described above. The puncture strength after 10% shrinkage was determined from the above formula (2).

Thickness of Film

Measurement was performed using a dial gauge in accordance with JIS K7130-1999 A method.

Density of Film

The density of a sample of about 3 mm square was measured by a density gradient tube method of JIS-K-7112 using an aqueous calcium nitrate solution.

Refractive Index in Longitudinal Direction

According to the JIS K 7142-1996 A method, the refractive index in the film longitudinal direction was measured by an Abbe refractometer using sodium D line as a light source and diiodomethane as a contact liquid.

Haze of Film

In accordance with JIS K7361-1, a film was cut into a square shape having a side of 10 cm, and haze measurement was performed using a haze meter NDH2000 manufactured by NIPPON DENSHOKU INDUSTRIES Co., Ltd. The measurement was performed at 3 points, and the average value thereof was used as the measured haze value. The haze in terms of 20 μm was calculated according to the following formula (3).

$$\text{Haze} = \text{measured haze value} \times 20/\text{thickness of film} \quad (\%/20 \text{ μm}) \qquad \text{Formula 3}$$

Tg (Glass Transition Point)

Tg was determined in accordance with JIS-K7121-1987 using a differential scanning calorimeter (model: DSC220) manufactured by Seiko Instruments & Electronics Ltd. Specifically, 10 mg of an undrawn film was heated from −40° C. to 120° C. at a ramp rate of 10° C./min, and an endothermic curve was measured. Tangent lines were drawn before and after an inflection point of the obtained endothermic curve, and an intersecting point thereof was defined as a glass transition point (Tg; ° C.).

Shrinkage Finish Property

The ends of the heat-shrinkable film were welded with an impulse sealer (manufactured by FUJIIMPULSE Co., Ltd.) to obtain a cylindrical label in which the width direction was the circumferential direction. Further, holes of 0.5 mm size were made at a pitch of 3 mm in the film longitudinal direction. In addition, holes having a size of 0.5 mm were similarly made at a pitch of 3 mm in the film longitudinal direction at intervals of 10 mm in the film width direction (so-called perforation for making it easy to peel off the label). The diameter of the label in the shrinkage direction was 68 mm. This label was put on a commercially available 500 ml PET bottle (with contents; body diameter 62 mm, minimum diameter of neck 25 mm), which was passed through steam using a steam tunnel manufactured by Fuji Astec Inc. (model; SH-1500 L) adjusted to 90° C. (time for passing through the tunnel 5 seconds) to heat shrink the label. The shrinkage finish property of the label was visually evaluated according to the following criteria. It was visually rated in five grades according to the following criteria. The defects described below mean jumping up, wrinkling, insufficient shrinkage, label edge folding, shrinkage whitening, and the like. One rated 3 or more was regarded as acceptable.

5: best finish property (no defect)
4: good finish property (with one defect)
3: 2 defects
2: 3 to 5 defects
1: many defects (6 or more locations)

Evaluation of Dropped Bag Upon Bag Dropping

The 500 ml PET bottle described above with the label being arranged horizontally and the perforation facing downward was dropped from a height of 1.2 m onto the concrete. The label after the dropping was visually rated according to the following criteria.

○: one or less label with bag breakage in evaluation of 10 dropped bags
x: two or more labels with bag breakage in evaluation of 10 dropped bags Evaluation of Hole Upon Bag Dropping As described above, the 500 ml PET bottle with the label being arranged horizontally and the perforation facing downward was dropped from a height of 1.2 m onto the concrete. The label after the dropping was visually rated according to the following criteria.

○: one or less label with a hole in evaluation of 10 dropped bags
x: two or more labels with a hole in evaluation of 10 dropped bags Preparation of Polyester Raw Material Synthesis Example 1

In a stainless steel autoclave equipped with a stirrer, a thermometer, and a partial reflux condenser, 100 mol % of dimethyl terephthalate (DMT) as a dicarboxylic acid component and 100 mol % of ethylene glycol (EG) as a polyhydric alcohol component were charged such that ethylene glycol was 2.2 times as much as dimethyl terephthalate in terms of a molar ratio, 0.05 mol % (based on the acid component) of zinc acetate as a transesterification catalyst and 0.225 mol % (based on the acid component) of antimony trioxide as a polycondensation catalyst were added thereto. The transesterification reaction was carried out while generated methanol was distilled out of the system. Thereafter, a polycondensation reaction was performed at 280° C. under a reduced pressure conditions of 26.7 Pa to obtain a polyester A having a limiting viscosity of 0.70 dl/g. The composition is shown in Table 1.

Synthesis Examples 2 to 4

The polyesters B to D shown in Table 1 were obtained in the same manner as in Synthesis Example 1. In the production of the polyester B, SiO2 (SYLYSIA 266 manufactured by Fuji Silysia Chemical Ltd.; average particle size 1.5 μm) was added in a proportion of 20,000 ppm based on the polyester. The limiting viscosities of the polyesters were all 0.70 dl/g. Each polyester was appropriately formed into chip shapes. The composition of each polyester is shown in Table 1.

TABLE 1

| | Raw material composition of polyester (mol %) | | | Amount of | |
| | Dicarboxylic acid component | Polyhydric alcohol component | | lubricant added | Limiting viscosity |
| | DMT | EG | DEG | (ppm) | (dl/g) |
| Polyester A | 100 | 100 | 0 | 0 | 0.7 |
| Polyester B | 100 | 100 | 0 | 20000 | 0.7 |
| Polyester C | 100 | 60 | 40 | 0 | 0.7 |
| Polyester D | 100 | 40 | 60 | 0 | 0.7 |

* DMT: Dimethyl terephthalate
EG: Ethylene glycol
DEG: Diethylene glycol

Example 1

The polyester A, the polyester B, and the polyester C were mixed at a mass ratio of 17:3:80 and charged into an extruder. Thereafter, the mixed resin was melted at 270° C. using a four-axis screw, extruded from a T-die while being cooled to 260° C., wound around a rotating metal roll cooled to a surface temperature of 20° C., and rapidly cooled to obtain an undrawn film having a thickness of 99 μm. The Tg of the undrawn film was 50° C. The undrawn film was guided to a tenter, preheated to a film temperature of 90° C. (Tg+40° C.) with both ends of the film held by clips, and then drawn 5 times in the lateral direction at a film temperature of 55° C. (Tg+5° C.). At this time, by shortening the distance between the clips in the longitudinal direction, 1% relaxation was performed in the longitudinal direction. The film drawn in the width direction was heat fixed at 57° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3.

With regard to both the shrinkage finish property and the evaluation of dropped bag, the film has no problem in practical use.

Example 2

The polyester A, the polyester B, and the polyester C were mixed at a mass ratio of 7:3:90 and charged into an extruder, and obtained an undrawn film having a thickness of 99 μm in the same way as Example 1. The Tg of the undrawn film was 48° C. The undrawn film was guided to a tenter, preheated to a film temperature of 88° C. (Tg+40° C.) with both ends of the film held by clips, and then drawn 5 times in the lateral direction at a film temperature of 53° C. (Tg+5° C.). At this time, by shortening the distance between the clips in the longitudinal direction, 1% relaxation was performed in the longitudinal direction. The film drawn in the width direction was heat fixed at 55° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3. With regard to both the shrinkage finish property and the evaluation of dropped bag, the film has no problem in practical use.

Example 3

The polyester A, the polyester B, and the polyester C were mixed at a mass ratio of 57:3:40 and charged into an extruder, and obtained an undrawn film having a thickness of 99 μm in the same way as Example 1. The Tg of the undrawn film was 63° C. The undrawn film was guided to a tenter, preheated to a film temperature of 103° C. (Tg+40° C.) with both ends of the film held by clips, and then drawn 5 times in the lateral direction at a film temperature of 68° C. (Tg+5° C.). At this time, by shortening the distance between the clips in the longitudinal direction, 1% relaxation was performed in the longitudinal direction. The film drawn in the width direction was heat fixed at 70° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3. With regard to both the shrinkage finish property and the evaluation of dropped bag, the film has no problem in practical use.

Example 4

The polyester A, the polyester B, and the polyester C were mixed at a mass ratio of 77:3:20 and charged into an extruder, and obtained an undrawn film having a thickness of 79 μm in the same way as Example 1. The Tg of the undrawn film was 70° C. The undrawn film was guided to a tenter, preheated to a film temperature of 115° C. (Tg+45° C.) with both ends of the film held by clips, and then drawn 4 times in the lateral direction at a film temperature of 75° C. (Tg+5° C.). At this time, by shortening the distance between the clips in the longitudinal direction, 2% relaxation was performed in the longitudinal direction. The film drawn in the width direction was heat fixed at 77° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3. With regard to both the shrinkage finish property and the evaluation of dropped bag, the film has no problem in practical use.

Example 5

The polyester A, the polyester B, and the polyester C were mixed at a mass ratio of 57:3:40 and charged into an extruder, and obtained an undrawn film having a thickness of 118 μm in the same way as Example 1. The Tg of the undrawn film was 63° C. The undrawn film was guided to a tenter, preheated to a film temperature of 103° C. (Tg+40° C.) with both ends of the film held by clips, and then drawn 6 times in the lateral direction at a film temperature of 68° C. (Tg+5° C.). At this time, by shortening the distance between the clips in the longitudinal direction, 2% relaxation was performed in the longitudinal direction. The film drawn in the width direction was heat fixed at 70° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3. With regard to both the shrinkage finish property and the evaluation of dropped bag, the film has no problem in practical use.

Example 6

The polyester A, the polyester B, and the polyester C were mixed at a mass ratio of 57:3:40 and charged into an extruder, and obtained an undrawn film having a thickness of 79 μm in the same way as Example 1. The Tg of the undrawn film was 63° C. The undrawn film was guided to a tenter, preheated to a film temperature of 103° C. (Tg+40° C.) with both ends of the film held by clips, and then drawn 4 times in the lateral direction at a film temperature of 68° C. (Tg+5° C.). At this time, by shortening the distance between the clips in the longitudinal direction, 1% relaxation was performed in the longitudinal direction. The film drawn in the width direction was heat fixed at 70° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3. With regard to both the shrinkage finish property and the evaluation of dropped bag, the film has no problem in practical use.

Example 7

A film roll having a thickness of 15 μm was obtained in the same film formation conditions as Example 1 except that the melted mixed resin was wound around the rotating metal roll by lowering discharge of the mixed resin from the extruder and rapidly cooled to obtain an undrawn film having a thickness of 74 μm. The properties of the obtained film were evaluated by the above method. The film formation conditions are shown in Table 2, and the evaluation results are shown in Table 3.

With regard to both the shrinkage finish property and the evaluation of dropped bag, the film has no problem in practical use.

Example 8

A film roll having a thickness of 40 μm was obtained in the same film formation conditions as Example 1 except that the melted mixed resin was wound around the rotating metal roll by lowering discharge of the mixed resin from the extruder and rapidly cooled to obtain an undrawn film having a thickness of 198 μm. The properties of the obtained film were evaluated by the above method. The film formation conditions are shown in Table 2, and the evaluation results are shown in Table 3.

With regard to both the shrinkage finish property and the evaluation of dropped bag, the film has no problem in practical use.

Comparative Example 1

The polyester A, the polyester B, and the polyester C were mixed at a mass ratio of 42:3:55 and charged into an extruder. Thereafter, the mixed resin was melted at 270° C. using a four-axis screw, extruded from a T-die while being cooled to 260° C., wound around a rotating metal roll cooled to a surface temperature of 20° C., and rapidly cooled to obtain an undrawn film having a thickness of 130 μm. The Tg of the undrawn film was 57° C. The undrawn film was guided to a tenter, preheated to a film temperature of 97° C. (Tg+40° C.) with both ends of the film held by clips, and then drawn 6.5 times in the lateral direction at a film temperature of 62° C. (Tg+5° C.). The film drawn in the width direction was heat fixed at 64° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3.

The film showed a high refractive index in the film longitudinal direction and breakage in evaluation of dropped bag, which was evaluated failure.

Comparative Example 2

The polyester A, the polyester B, and the polyester C were mixed at a mass ratio of 77:3:20 and charged into an extruder, and obtained an undrawn film having a thickness of 80 μm in the same way as Example 1. The Tg of the undrawn film was 70° C. The undrawn film was guided to a tenter, preheated to a film temperature of 75° C. (Tg+5° C.) with both ends of the film held by clips, and then drawn 4 times in the lateral direction at a film temperature of 75° C. (Tg+5° C.). The film drawn in the width direction was heat fixed at 77° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3.

The film showed a low puncture strength of the film, a high refractive index in the film longitudinal direction, and breakage and holes in evaluation of dropped bag, which was evaluated failure.

Comparative Example 3

The polyester A, the polyester B, and the polyester C were mixed at a mass ratio of 17:3:80 and charged into an extruder, and tried to obtain an undrawn film having a thickness of 80 μm in the same way as Example 1. However, the undrawn film could not obtained continuously because the mixed resin was adhered to a cooling roll due to the Tg thereof was 38° C. Therefore, the film formation could not be evaluated.

Comparative Example 4

The polyester A, the polyester B, and the polyester C were mixed at a mass ratio of 92:3:5 and charged into an extruder, and obtained an undrawn film having a thickness of 99 μm in the same way as Example 1. The Tg of the undrawn film was 75° C. The undrawn film was guided to a tenter, preheated to a film temperature of 115° C. (Tg+40° C.) with both ends of the film held by clips, and then drawn 5 times in the lateral direction at a film temperature of 80° C. (Tg+5° C.). At this time, by shortening the distance between the clips in the longitudinal direction, 1% relaxation was performed in the longitudinal direction. The film drawn in the width direction was heat fixed at 82° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3.

The film showed a low hot water heat shrinkage ratio in the film width direction immersed in hot water at 90° C. for 10 seconds and insufficient shrinkage of shrinkage finish property, and therefore, could not evaluate shrinkage finish property and dropped bag.

Comparative Example 5

The polyester A, the polyester B, and the polyester C were mixed at a mass ratio of 17:3:80 and charged into an extruder, and obtained an undrawn film having a thickness of 101 μm in the same way as Example 1. The Tg of the undrawn film was 50° C. The undrawn film was guided to a tenter, preheated to a film temperature of 90° C. (Tg+40° C.) with both ends of the film held by clips, and then drawn 4 times in the lateral direction at a film temperature of 55° C. (Tg+5° C.). At this time, by broadening the distance between the clips in the longitudinal direction, 2% drawn was performed in the longitudinal direction. The film drawn in the width direction of 4 times and in the longitudinal direction of 1.02 times was heat fixed at 57° C. (Tg+7° C.). Both edges of the drawn film were cut and removed to continuously form a uniaxially drawn film of about 20 μm over a predetermined length, thereby obtaining a film roll made of a heat-shrinkable polyester-based film. The properties of the obtained film were evaluated by the above method. The film formation conditions are shown in Table 2, and the evaluation results are shown in Table 3.

The film showed a high refractive index in the film longitudinal direction, and breakage in evaluation of dropped bag, which was evaluated failure.

TABLE 2

| | | Lateral drawing conditions | | | | |
| | | Preheating | Drawing conditions | | | Heat fixation |
| | Raw material ratio | temperature (° C.) | Temperature (° C.) | Draw ratio | Relaxation ratio (%) in longitudinal direction | temperature (° C.) |
|---|---|---|---|---|---|---|
| Example 1 | A/B/C = 17/3/80 | 90 | 55 | 5 | 1 | 57 |
| Example 2 | A/B/C = 7/3/90 | 88 | 53 | 5 | 1 | 55 |
| Example 3 | A/B/C = 57/3/40 | 103 | 68 | 5 | 1 | 70 |
| Example 4 | A/B/C = 77/3/20 | 115 | 75 | 4 | 2 | 77 |
| Example 5 | A/B/C = 57/3/40 | 103 | 68 | 6 | 2 | 70 |
| Example 6 | A/B/C = 57/3/40 | 103 | 68 | 4 | 1 | 70 |
| Example 7 | A/B/C = 17/3/80 | 90 | 55 | 5 | 1 | 57 |
| Example 8 | A/B/C = 17/3/80 | 90 | 55 | 5 | 1 | 57 |
| Comparative example 1 | A/B/C = 42/3/55 | 97 | 62 | 6.5 | 0 | 64 |
| Comparative example 2 | A/B/C = 77/3/20 | 75 | 75 | 4 | 0 | 77 |
| Comparative example 3 | A/B/D = 17/3/80 | 84 | 49 | 4 | 0 | 51 |
| Comparative example 4 | A/B/C = 92/3/5 | 115 | 80 | 5 | 1 | 82 |
| Comparative example 5 | A/B/C = 17/3/80 | 90 | 55 | 5 | −2 | 57 |

TABLE 3

| | Glass transition temperature (° C.) | Diethylene glycol ratio (mol %) | Limiting viscosity (dl/g) | Hot water shrinkage ratio (%) at 90° C. for 10 seconds | | Puncture strength (N/μm) | |
| | | | | Width direction | Longitudinal direction | No treatment | After 10% shrinkage |
|---|---|---|---|---|---|---|---|
| Example 1 | 50 | 32 | 0.64 | 75 | 3 | 0.5 | 0.4 |
| Example 2 | 48 | 36 | 0.64 | 75 | 2 | 0.5 | 0.4 |
| Example 3 | 63 | 16 | 0.66 | 68 | 3 | 0.35 | 0.25 |
| Example 4 | 70 | 8 | 0.67 | 60 | 3 | 0.24 | 0.14 |
| Example 5 | 63 | 16 | 0.66 | 65 | 1 | 0.44 | 0.34 |
| Example 6 | 63 | 16 | 0.66 | 65 | 2 | 0.3 | 0.2 |

TABLE 3-continued

| | | | | | | | |
|---|---|---|---|---|---|---|---|
| Example 7 | 50 | 32 | 0.64 | 75 | 4 | 0.51 | 0.4 |
| Example 8 | 50 | 32 | 0.64 | 74 | 1 | 0.49 | 0.4 |
| Comparative example 1 | 57 | 22 | 0.65 | 68 | 7 | 0.46 | 0.36 |
| Comparative example 2 | 70 | 8 | 0.67 | 48 | 12 | 0.17 | 0.07 |
| Comparative example 3 | 38 | 48 | 0.61 | — | — | — | — |
| Comparative example 4 | 75 | 2 | 0.67 | 25 | 5 | 0.15 | 0.08 |
| Comparative example 5 | 50 | 32 | 0.64 | 75 | 7 | 0.52 | 0.42 |

| | Orientation in longitudinal direction | Density (g/cm³) | Thickness (μm) | Haze (%) | Shrinkage finish property | Evaluation of dropped bag Bag breakage | Hole |
|---|---|---|---|---|---|---|---|
| Example 1 | 1.563 | 1.362 | 20 | 3.5 | 3 | ◯ | ◯ |
| Example 2 | 1.561 | 1.360 | 20 | 3.5 | 3 | ◯ | ◯ |
| Example 3 | 1.568 | 1.370 | 20 | 3.7 | 4 | ◯ | ◯ |
| Example 4 | 1.570 | 1.379 | 20 | 3.9 | 4 | ◯ | ◯ |
| Example 5 | 1.572 | 1.381 | 20 | 3.9 | 3 | ◯ | ◯ |
| Example 6 | 1.560 | 1.362 | 20 | 3.3 | 4 | ◯ | ◯ |
| Example 7 | 1.564 | 1.363 | 15 | 2.9 | 3 | ◯ | ◯ |
| Example 8 | 1.561 | 1.361 | 40 | 6.5 | 3 | ◯ | ◯ |
| Comparative example 1 | 1.579 | 1.370 | 20 | 3.4 | 4 | X | ◯ |
| Comparative example 2 | 1.581 | 1.381 | 20 | 3.8 | 3 | X | X |
| Comparative example 3 | — | — | — | — | — | — | — |
| Comparative example 4 | 1.570 | 1.388 | 20 | 4.2 | — | — | — |
| Comparative example 5 | 1.580 | 1.362 | 20 | 3.5 | 3 | X | ◯ |

INDUSTRIAL APPLICABILITY

The heat-shrinkable polyester-based film of the present invention has excellent bag-drop resistance in spite of having a high heat shrinkage ratio, and thus can be suitably used in applications as labels for containers and the like. A packaging body of a container or the like obtained by using the heat-shrinkable polyester-based film of the present invention as a label has a beautiful appearance and is excellent in durability such as bag-drop resistance.

The invention claimed is:

1. A heat-shrinkable polyester-based film comprising:
the heat-shrinkable polyester-based film contains
60 mol % or more and 95 mol % or less of ethylene terephthalate units in 100 mol % of all ester units,
5 mol % or more and 40 mol % or less of diethylene glycol in 100 mol % of the polyhydric alcohol component, and
0 mol % or more and 5 mol % or less of constituent units derived from a monomer component that can be an amorphous component in all polyester resin components, wherein the monomer component that can be an amorphous component is neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, or hexanediol, and
the heat-shrinkable polyester-based film satisfies the following requirements (1) to (5):

(1) a hot water heat shrinkage ratio in the film width direction is 40% or more and 80% or less when the film is immersed in hot water at 90° C. for 10 seconds;
(2) a hot water heat shrinkage ratio in the film longitudinal direction is −5% or more and 15% or less when the film is immersed in hot water at 90° C. for 10 seconds;
(3) a puncture strength of the film is 0.2 N/μm or more and 0.6 N/μm or less as measured according to JIS Z1707;
(4) a density of the film is 1.330 g/cm³ or more and 1.385 g/cm³ or less; and
(5) the refractive index in the film longitudinal direction is 1.575 or less.

2. The heat-shrinkable polyester-based film according to claim 1, wherein a thickness of the film is 15 μm or more.

3. The heat-shrinkable polyester-based film according to claim 1, wherein a haze value at a thickness of 20 μm of the film is 2% or more and 10% or less.

4. The heat-shrinkable polyester-based film according to claim 1, wherein the puncture strength of the film after the film is shrunk by 10% in the width direction is 0.1 N/μm or more and 0.5 N/μm or less.

5. A heat-shrinkable label including the heat-shrinkable polyester-based film according to claim 1.

6. A packaging body comprising
an object to be packed; and
the heat-shrinkable label according to claim 5;
wherein at least a part of a periphery of the object is packed by the label.

* * * * *